US012682323B2

(12) United States Patent
Fahim et al.

(10) Patent No.: US 12,682,323 B2
(45) Date of Patent: Jul. 14, 2026

(54) ARTIFICIAL INTELLIGENCE-POWERED INCUBATION MANAGEMENT SYSTEM

(71) Applicant: KPMG International Services Ltd, London (GB)

(72) Inventors: Nadine Fahim, Tampa, FL (US); David Anema, Amstelveen (NL)

(73) Assignee: KPMG International Services Ltd, London (GB)

( * ) Notice: Subject to any disclaimer, the term of this patent is extended or adjusted under 35 U.S.C. 154(b) by 0 days.

(21) Appl. No.: 19/068,193

(22) Filed: Mar. 3, 2025

(65) Prior Publication Data

US 2025/0278698 A1 Sep. 4, 2025

Related U.S. Application Data

(60) Provisional application No. 63/560,848, filed on Mar. 4, 2024.

(51) Int. Cl.
*G06Q 10/10* (2023.01)
*G06Q 10/0631* (2023.01)
(Continued)

(52) U.S. Cl.
CPC ... *G06Q 10/103* (2013.01); *G06Q 10/063118* (2013.01); *G06Q 10/06393* (2013.01); *G06Q 30/0202* (2013.01)

(58) Field of Classification Search
CPC ........... G06Q 10/103; G06Q 10/06393; G06Q 30/0202; G06Q 10/0635; G06Q 10/0637
See application file for complete search history.

(56) References Cited

U.S. PATENT DOCUMENTS

2006/0161883 A1* 7/2006 Lubrecht ................ G06Q 10/06
717/104
2007/0250335 A1* 10/2007 Hodges .............. G06Q 10/0633
705/7.27
(Continued)

FOREIGN PATENT DOCUMENTS

IN 202411008223 A * 2/2024

OTHER PUBLICATIONS

English translation of IN202411008223A (Year: 2024).*
(Continued)

*Primary Examiner* — Jeremy L Gunn

(57) ABSTRACT

Systems and methods are provided for innovation ideation and project management using an artificial intelligence (AI) model. In an ideation phase, the AI model generates project details for proposed projects and generates a list of proposed personnel to staff the proposed projects based on historical staffing data. In a project monitor phase, the AI model defines key performance indicators (KPIs) for projects and generates suggested strategies for mitigating threshold violations of the KPIs. In an external factor monitoring phase, the AI model generates what-if scenarios for projects based on project details and market data and generates suggested strategies for mitigating the what-if scenarios based on past problem-solution data. In a market monitoring phase, the AI model monitors market signal data and generates market demand analyses based on the KPI and the market signal data. In a competitor analysis phase, the AI model identifies competitors, generates a competitor profiles, monitors competitor performance and activity, and generates competitor analyses in view of the project details and KPIs.

19 Claims, 12 Drawing Sheets

(51) Int. Cl.
     *G06Q 10/0639*        (2023.01)
     *G06Q 30/0202*        (2023.01)

(56)                    References Cited

U.S. PATENT DOCUMENTS

| | | | | |
|---|---|---|---|---|
| 2015/0100515 A1* | 4/2015 | George | ............... | G06Q 10/067 |
| | | | | 705/342 |
| 2015/0161680 A1* | 6/2015 | Tang | .................. | G06Q 30/0275 |
| | | | | 705/14.71 |
| 2017/0052536 A1* | 2/2017 | Warner | ............ | G06Q 10/06312 |
| 2018/0349829 A1* | 12/2018 | Peterson | ........ | G06Q 10/063112 |
| 2023/0069133 A1* | 3/2023 | Matsuoka | ......... | G06F 16/33295 |
| 2024/0104484 A1* | 3/2024 | Kanagarajan | .. | G06Q 10/063114 |
| 2025/0156153 A1* | 5/2025 | Goldberg | ....... | G06Q 10/063118 |

OTHER PUBLICATIONS

Gathani, Sneha and Liu, Zhicheng and Haas, Peter J. and Demiralp,
What-if Analysis for Business Professionals: Current Practices and
Future Opportunities, 2022 (Year: 2022).*

* cited by examiner

FIG. 5     500

ARTIFICIAL INTELLIGENCE-POWERED INCUBATION MANAGEMENT SYSTEM

CROSS-REFERENCE TO RELATED APPLICATIONS

This application claims the benefit of U.S. Provisional Application No. 63/560,848 filed Mar. 4, 2024, which is incorporated herein in its entirety.

TECHNICAL FIELD

The present disclosure is generally related to an improved innovation system, and more specifically, to an artificial intelligence driven system for generating and incubating product, program, and portfolio ideas from ideation through go-to-market.

BACKGROUND OF THE INVENTION

Currently product creators (both technical and not) create and develop innovations using an ad-hoc approach that results in missed ideas, inefficiencies, and duplicative work. For example, an innovation may be created using in-person or virtual brainstorming sessions and tools or by starting with a competitor tool as a template. That innovation may then be taken through the go-to-market process of that company using typical manual processes that including branding and market analysis. Tools that are generally used in these processes include spreadsheets, note taking or white board applications, project management tools, file sharing tools, and the like, all separate applications or tools and not interconnected.

However, there is no known system that leverages the power of artificial intelligence to generate innovations; propose teams to design and create requirements around those innovations; assess and manage projects to implement those innovations; assess internal and external factors that could affect those projects; assess and predict market demand; and assess current or potential competitive activity.

SUMMARY OF THE INVENTION

The following presents a simplified summary of various aspects described herein. This summary is not an extensive overview and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

In one aspect, a method is provided for innovation ideation and project management using an artificial intelligence (AI) model communicatively coupled to a server, a database, and one or more client devices by a network. In the method the AI model performs an ideation phase, a project monitoring phase, an external factor monitoring phase, a market monitoring phase, and a competitor analysis phase. In the ideation phase, the AI model generates project details for at least one proposed project and generates a list of proposed personnel to staff the proposed project based on historical staffing of similar projects stored in the database. In the project monitor phase, the AI model defines at least one key performance indicator (KPI) for the proposed project, sets a trigger threshold for the KPI based on historical performance data of projects as stored in the database, and receives an alert related to a threshold violation of the KPI and generating at least one suggested strategy for mitigating the threshold violation. In an external factor monitoring phase, the AI model monitors external factor data during performance of the proposed project, generates at least one what-if scenario for the proposed project based on details of the proposed project and market data stored in the database, and generates at least one suggested strategy for mitigating the what-if scenario based on past problem-solution data stored in the database. In the market monitoring phase, the AI model monitors market signal data including financial news and data stored in the database and generates a market demand analysis based on the KPI and the market signal data. In the competitor analysis phase, the AI model identifies at least one competitor in an industry related to the proposed project, generates a competitor profile for the identified competitor, monitors competitor performance and activity, and generates a competitor analysis in view of the proposed project details and the KPI.

In another aspect, an ideation method uses an AI model communicatively coupled to a server, a database, and one or more client devices by a network. The AI model receives as input a name of an innovation challenge, generates a challenge problem statement and challenge description based on the input name, generates at least one proposed project for solving the challenge problem statement, generates a list of proposed personnel to staff the proposed project based on historical staffing of similar projects stored in the database, and selects personnel from the list of proposed personnel to staff the proposed project.

In another aspect, a project monitoring method uses an AI model communicatively coupled to a server, a database, and one or more client devices by a network. The AI model defines at least one key performance indicator (KPI) for a project, sets a trigger threshold for the KPI based on historical performance data of projects as stored in the database, monitors adherence to the KPI during project performance, detects when the KPI violates the threshold, receives an alert related to a threshold violation of the KPI, and generates at least one suggested strategy for mitigating the threshold violation.

In another aspect, an external factor monitoring method uses an AI model communicatively coupled to a server, a database, and one or more client devices by a network. The AI model monitors external factor data during performance of at least one project, collects performance data of the project, compares the performance data to the external factor data and internal policies, generates a what-if scenario for the project based on the comparison, detects if the what-if scenario results in a negative result to the KPI, and generates at least one suggested strategy for mitigating the what-if scenario based on past problem-solution data stored in the database.

In another aspect, a market monitoring method uses an AI model communicatively coupled to a server, a database, and one or more client devices by a network. The AI model monitors market signal data including financial news and data stored in the database and generates a market demand analysis based on at least one key performance indicator (KPI) for a project and the market signal data.

In another aspect, a competitor analysis method uses an AI model communicatively coupled to a server, a database, and one or more client devices by a network. The AI model identifies at least one first competitor in a first industry related to a project and at least one second competitor in a second industry, generates a competitor profile for the at least one first competitors and the at least one second competitors, monitors performance and activity for the at least one first competitors and the at least one second competitors, and generates a competitor analysis that compares the project to the competitor profiles for the at least one first competitors and the at least one second competitors.

BRIEF DESCRIPTION OF DRAWINGS

The present disclosure is described by way of example and not limited in the accompanying figures in which like reference numbers indicate similar elements and in which.

DETAILED DESCRIPTION OF THE INVENTION

Figure 1:
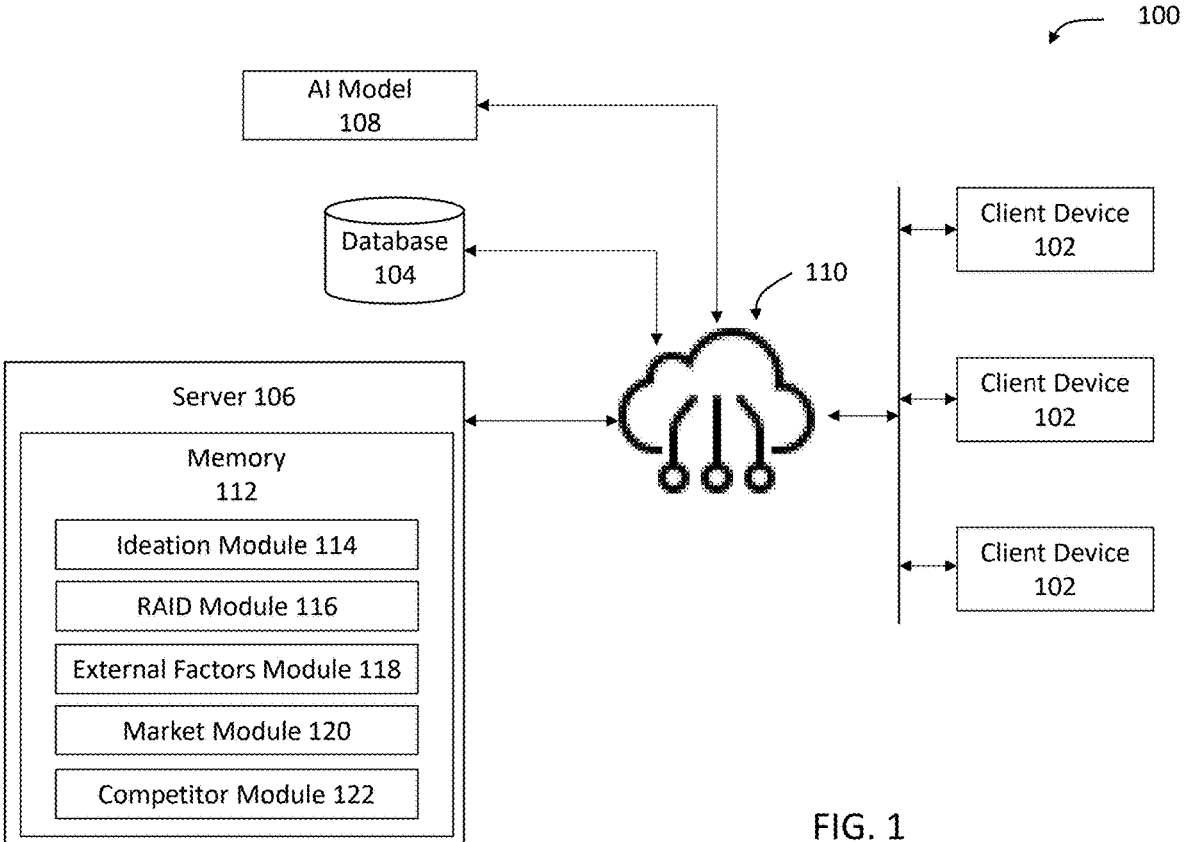
FIG. 1 is a block diagram of a system for project management incorporating one or more LLMs.

In the following description of embodiment of the invention, reference is made to the accompanying figures, which show by way of illustration embodiment in which aspects of the disclosure may be practiced. Other embodiments may be used, and structural or functional modifications may be made without departing from the scope of the present disclosure. Aspects of the disclosure are capable of other embodiments and of being practiced in various ways. In addition, the terminology used in this disclosure is for the purpose of description and should not be regarded as limiting. Rather, the phrases and terms used should be given their broadest interpretation and meaning.

As used herein, the term "product" generally refers to a single product that is taken by an organization through the ideation, design, development, and go-to-market phases. The product may be a software product, a physical hardware product, or a combination of software and hardware. Similarly, a "program" may also refer to a single product, but also to a service or a set of connected products or services. A "portfolio" may refer to a set of products or services that are connected in some way, such as brand or consumer focus. The term "innovation" as used herein refers generally to any of the preceding terms (e.g., product, program, or portfolio) and can include more than one product, program, or portfolio.

Known techniques for innovation ideation generally use manual tools such as whiteboards (physical and virtual) and shared files. Moreover, staffing is also typically a manual process in which the team that is involved in the brainstorming automatically becomes the team that designs and implements an innovation. However, ideas in these sessions are inherently limited to the people in the room, such that new innovative ideas are not created because of the lack of connections outside of the room. As is well known in the industry, classic brainstorming and similar techniques of ideation depend entirely on humans, and therefore cannot necessarily recognize patterns among a massive amount of data relating to ideas, products, personnel, and policies. In addition, there may be people better suited to design or implement an innovation that are not part of the brainstorming session.

Similarly, organizations are challenged on how to efficiently assess project management metrics once an innovation, such as risks, assumptions, issues, and dependencies (RAID) in order to make informed project decisions. Typically, organizations use manual processes and tools such as spreadsheets or project management tools that require manual updates due to changes. However, the project team may not recognize that a change is required or why. For example, internal factors may affect one or more RAID items, but the effects may not be readily apparent to the project team. In addition, factors such as market trends, regulatory proposals or changes, and changes in economic conditions can have an impact on project plans but may not be recognized. Either of these issues can cause late, unforeseen changes to the project that can result in delayed release, pricing issues, or lack of alignment to requirements. Another issue that organizations currently face is how to efficiently evaluate market factors and leverage this information to make informed project decisions. Further, competitive analysis is generally only completed at the beginning or end of a project and not continuously. A given competitive analysis may also be done with limited information.

The systems and methods described herein provide an artificial intelligence (AI) model, which may be a generative AI model such as an LLM, that facilitates remaking the overall innovation process in a business. One or more large AI models are used by the system to (a) provide ideas for innovation proposals and suggest team members for the proposal; (b) predict and monitor the dependencies of the innovation proposal (i.e., budget, personnel, other resources, timeline); (c) monitor external factors to determine the roadmap of the innovation proposal; (d) predict and monitor the market demand for the innovation proposal; and (e) conduct and monitor competitor activity to determine its effects on the innovation proposal. Notably, the information input into the systems and methods is stored and can be later used for fine tuning the AI model, acting as a feedback mechanism. In addition, the output generated by the AI model is also stored for similar feedback usage. Moreover, the output generated by the AI model one process of the overall method is used as input into one or more other processes of the method.

More specifically, embodiments of the invention enable an increase in the quality and quantity of innovative ideas and improves the functionality of standard computer systems in this field by using AI models to predict logical ideas for innovation and logical teams based on existing skillsets. There is currently no way to provide this functionality. Moreover, embodiments of the invention use AI models to improve the ability of standard computers to predict the cost, training and resource needs, and budget to complete a project. The invention also enables analysis of a RAID log to determine how changes to any of those categories affects the predictions and what changes are necessary to recover. There is currently no known process for evaluating a RAID log that does not require too-costly amounts of computing power. Embodiments of the invention also use AI models to dynamically update an innovation roadmap based on changes to external factors such as news, economic reports or events, regulatory changes, and customer preferences and to improve the efficiency of standard computers to assess market factors and provide real-time and predictive analysis of data to identify any potential benefits or risks to an innovation proposal. Furthermore, embodiments of the invention improve standard computer systems when used for competitive analysis as those systems are unable to automatically monitoring current competitor landscape to assess business idea feasibility or identify opportunities and threats. The invention enables the use of AI models to provide this functionality.

Advantages of the embodiments described herein include AI model powered (a) idea generation and precise skillset matching of users to the project; (b) risk mitigation, prediction of potential roadblocks, and enabling more informed decisions, which are vital for the success of the project; (c) reduction in time needed to manage project prioritization, an ability to simulate project prioritization based on internal scenarios through prompts so that a user can see how prioritizing one project affects the development and release of other projects; (d) predictive scoring to provide stakeholders with an enriched near real time view of market comparison for innovation products and improved return on investment, breakdown of changes in resultant outcomes by project with clear explanations, and improvements in compliance to internal policies and scenarios; and (e) analysis of competitors and competitive activity.

FIG. 1 shows a block diagram of a system 100 for project management incorporating one or more AI models. The system 100 includes one or more client devices 102, one or more databases 104, and one or more servers 106 that may store one or more AI models 108. The AI model may be any suitable type of model or AI architecture, such as a large language model (LLM), a machine learning (ML) model, a neural network, or a decision tree. In the embodiments described herein, the AI model is an LLM. However, any suitable AI model may be used. These components are interconnected by a network 110. Although there are shown in FIG. 1 a single server 106, a single database 104, and a single AI model 108, embodiments of the invention may use multiple instances of each of these, such as multiple servers 106, multiple databases 104, and/or multiple AI models 108. Moreover, although the database 104 of FIG. 1 is shown external to the server 106, embodiments of the invention may include the database 104 as stored on the server 106 and accessed by the server 106. Similarly, although the AI model 108 of FIG. 1 is shown external to the server 106, embodiments of the invention may include the AI model 108 as stored on the server 106 and accessed by the server 106 and/or the client devices 102.

One or more memory modules 112 of the server 106 may host one or more application, such as an ideation module 114, a RAID module 116, an external factors module 118, a market module 120, and a competitor module 122. These applications 114-122 may provide instructions to the server 106 allowing the server 106 and client devices 102 to together perform various actions including data collection and analysis and interactions with the AI model 108 via programmatic prompting. The memory 112 may include volatile and/or nonvolatile memory and removable and/or non-removable media implemented in any method or technology for storage of information such as computer-readable instructions, data structures, program modules, or other data. The memory 112 may include one or more physical persistent memory devices and/or one or more non-persistent memory devices. In some embodiments, the memory 112 also includes a query agent module for use in prompt management to the AI model 108. The query agent module may, for example, perform a web search in cases where the default AI model 108 access to information is limited. For example, some AI models have date limits on the non-specialized information they were trained on. Often those date limits are too far in the past for truly useful prompts and answers to be provided. As such, the query agent module can make web search results part of the corpus used to further train the AI model 108 or to provide context in prompts to the AI model 108. The query agent module may be used in any of the steps described below to generate a prompt to the AI model 108.

The client devices 102 may access the applications 114-122 and/or other server resources using one or more client applications, such as a web browser, specifically developed application, or as part of any other application. A client device 102 may be a mobile device, such as a laptop, smart phone, or tablet, or a computing device, such as a desktop computer or server.

The database 104 may be configured to store, maintain, retrieve, and update information for the server 106 and applications 114-122. Further, the database 104 may provide the server 106 with information periodically or upon request. In this regard, the database 104 may be a distributed database capable of storing, maintaining, and updating large volumes of data across clusters of nodes. The database 104 may provide a variety of databases including, but not limited to, relational databases, hierarchical databases, distributed databases, in-memory databases, flat file databases, XML databases, NoSQL databases, graph databases, and/or a combination of any of these.

The AI model 108, in some embodiments, consists of multiple layers of neural networks and may be trained to generate a number of analyses as described below. In addition, the AI model 108 may be trained to generate prompts based on the specific operation of the methods described below and/or the module in use. The AI model 108 may generate prompts for its own use based on observed data or data stored database 104. In embodiments with multiple AI models, any given AI model 108 may generate prompts for use by other AI models. In the systems and methods described below, the AI model 108 is initially trained to provide the prompts and analyses also described below. The AI model 108 may be trained using data and/or information stored in any suitable manner, such as in the database 104, a data lake, local attached storage, network attached storage, or data feed via API. However, initially the AI model 108 is generally pre-trained. The AI model 108 uses its pre-trained knowledge and learned patterns to analyze input and predict the most likely next word or sequence of words. This prediction is based on the context provided by the prompt and the patterns the AI model 108 learned from the training data. The model's ability to generate coherent and contextually relevant responses is a result of its understanding of grammar, syntax, and semantic relationships between words. The generated output is probabilistic, whereby the AI model 108 assigns a probability to each possible word or sequence of words. It then selects the most likely option based on these probabilities, but it can also explore alternative options by sampling from the probability distribution. This allows for some level of creativity and variation in the generated output.

In the pre-training phase, a large dataset is acquired from the internet, including text from a high number of sources to ensure the AI model 108 learns a broad spectrum of language patterns. The server 106 cleans and preprocesses the data to remove noise, formatting issues, and irrelevant information. This process could be done via scripting, a machine learning model, or even another LLM that has already been trained. The server 106 then tokenizes the data into smaller units, such as words or subword pieces. In some embodiments, the AI model 108 has a transformer architecture that can be used due to its effectiveness in handling sequential data. Pre-training of the AI model 108 occurs by training the model to predict the next word in a sequence of text, using the cleaned dataset, to enable it to understand and generate human-like language.

The next phase of training the AI model 108 is tuning. The tuning phase may be supervised or unsupervised. However, in either case, during this phase the AI model 108 is provided with an input prompt and the trainer's response as the target. The AI model 108 can thus learn to generate responses by minimizing the difference between its predictions and the provided responses.

The third phase is training the AI model 108 is reinforcement learning. Generally, this is based on human feedback. However, a trained AI model could act as the feedback mechanism for the AI model undergoing training. During this phase, the trainer (human or LLM) will input a prompt to the AI model 108 multiple times, generally receiving slightly different outputs. The trainer then ranks the outputs.

The AI model 108 can be further trained on use-specific data. For example, for the embodiments described herein, the AI model 108 can be further trained using historical project data such as starting and ending budget and changes to budget over time; timeliness and changes to initially estimated timelines; team members, work histories, education histories, and roles; tasks and their order of completion and time to completion; and overall outcomes and feedback during and post-project. Other historical project data can also be used such as real-time data sources, including project management tools, client feedback systems, and market trends. The AI model 108 can also be further trained on external and internal information, including research reports, market news, bank statements, credit stores, market sentiment data, customer behavior data, and transaction data. Other internal data can include financial scenarios and rules or policies for the company. The AI model 108 can also be further trained on market demand data including market analyses of vendors, pricing comparisons, macro-economic risk data, and jurisdictional requirements and regulations. Questionnaire data may also be used to obtain market demand data. This data could include company name, a project overview description (e.g., value proposition or synopsis), key product features, estimated pricing per sale, sales forecasts, estimate operating margin, target industry for the project, targeted geographical locations, and/or available market in terms of revenue. In addition, the AI model 108 may be further trained on competitor data, including news articles or news summaries, industry alignment, and other data that may be available from commercial vendors, for example.

In some cases, if there is insufficient additional training data or the additional training data does not include suitable information for the AI model 108 it may not be possible to provide a high level of confidence. In other words, the specific type of data may not be readily reconcilable to a specific use case or classification. In such cases, synthetic data may be used to further train the AI model 108.

The server 106 may be configured with a server application that is capable of interfacing with the client applications and the database 104. In this regard, the server 106 may be a stand-alone server, a corporate server, or a server located in a server farm or cloud-computer environment. According to some examples, the server system may be a virtual server hosted on hardware capable of supporting a plurality of virtual servers.

Regarding the network 110, it should be noted that the network connections shown are illustrative and any means of establishing a communications link between the computers may be used. The existence of any of various network protocols such as TCP/IP, Ethernet, File Transfer Protocol (FTP) or Secure FTP (SFTP), HTTP and the like, and of various wireless communication technologies such as GSM, CDMA, Wi-Fi, LTE, and 5G is presumed, and the various computing devices described herein may be configured to communicate using any of these network protocols or technologies. Any of these devices and systems may be implemented, in whole or in part, using one or more computing systems described below and illustrated by FIG. 2.

The data transferred to and from various computing devices in system 100 may include secure and sensitive data, such as confidential documents, client personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, FTP, SFTP, and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
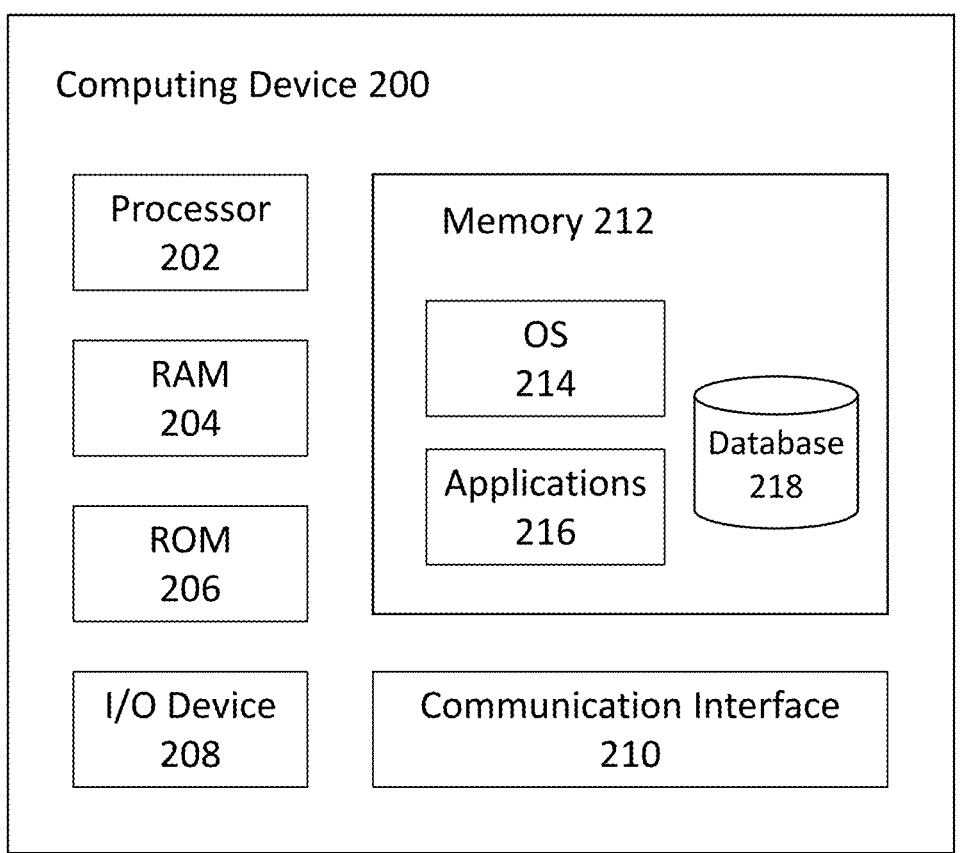
FIG. 2 is a block diagram illustrating a computing device that may be used with the server 106 and/or the client devices 102 described in FIG. 1.

FIG. 2 is a block diagram illustrating a computing device 200 that may be used with the server 106 and/or the client devices 102 described in FIG. 1. The computing device 200 may include one or more processors 202 for controlling overall operation of the computing device 200 and its associated components, including RAM 204, ROM 206, input/output device 208, communication interface 210, and/or memory 212. A data bus may interconnect the processor 202, RAM 204, ROM 206, memory 212, I/O device 208, and/or the communication interface 210. In some embodiments, the computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

The I/O device 208 may include a microphone, keypad, touch screen, and/or stylus through which a user of the computing device 200 may provide input and may also include one or more of a speaker for providing audio output and a video display device for providing textual, audiovisual, and/or graphical output. Software may be stored within a memory 212 to provide instructions to the processor 202 allowing the computing device 200 to perform various actions. For example, the memory 212 may store software used by the computing device 200, such as an operating system (OS) 214, application programs 216, and/or an associated internal database 218. Examples of the application programs 216 storable by the memory 212 include the ideation module 114, RAID module 116, external factors module 118, market module 120, and the competitor module 122 of FIG. 1. The database 218 may include database 104 of FIG. 1. The various hardware memory units in the memory 212 may include volatile and nonvolatile, removable and non-removable media implemented in any method or technology for storage of information such as computer-readable instructions, data structures, program modules, or other data. The memory 212 may include one or more physical persistent memory devices and/or one or more non-persistent memory devices. In some embodiments, the RAM 204 and/or ROM 206 may be part of the memory 212 along with electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by the processor 202.

The communication interface 210 may include one or more transceivers, digital signal processors, and/or additional circuitry and software for communicating via any network, wired or wireless, using any protocol as described above.

The processor 202 may include a single central processing unit (CPU), which may be a single-core or multi-core processor or may include multiple CPUs. The processor 202 and associated components may allow the computing device 200 to execute a series of computer-readable instructions to perform some or all of the processes described herein. Although not shown in FIG. 2, various elements within the memory 212 or other components in the computing device 200, may include one or more caches, for example, CPU caches used by the processor 202, page caches used by the OS 214, disk caches of a hard drive, and/or database caches used to cache content from the database 104. For embodiments including a CPU cache, the CPU cache may be used by one or more processors 202 to reduce memory latency and access time. A processor 202 may retrieve data from or write data to the CPU cache rather than reading/writing to the memory 212, which may improve the speed of these operations. In some examples, a database cache may be created in which certain data from the database 218 is cached in a separate smaller database in a memory separate from the database, such as in RAM 204 or on a separate computing device. For instance, in a multi-tiered application, a database cache on an application server may reduce data retrieval and data manipulation time by not needing to communicate over a network with a back-end database server. These types of caches and others may be included in various embodiments and may provide potential advantages in certain implementations of devices, systems, and methods described herein, such as faster response times and less dependence on network conditions when transmitting and receiving data.

Although various components of the computing device 200 are described separately, functionality of the various components may be combined and/or performed by a single component and/or multiple computing devices in communication without departing from the invention.

Figure 3:
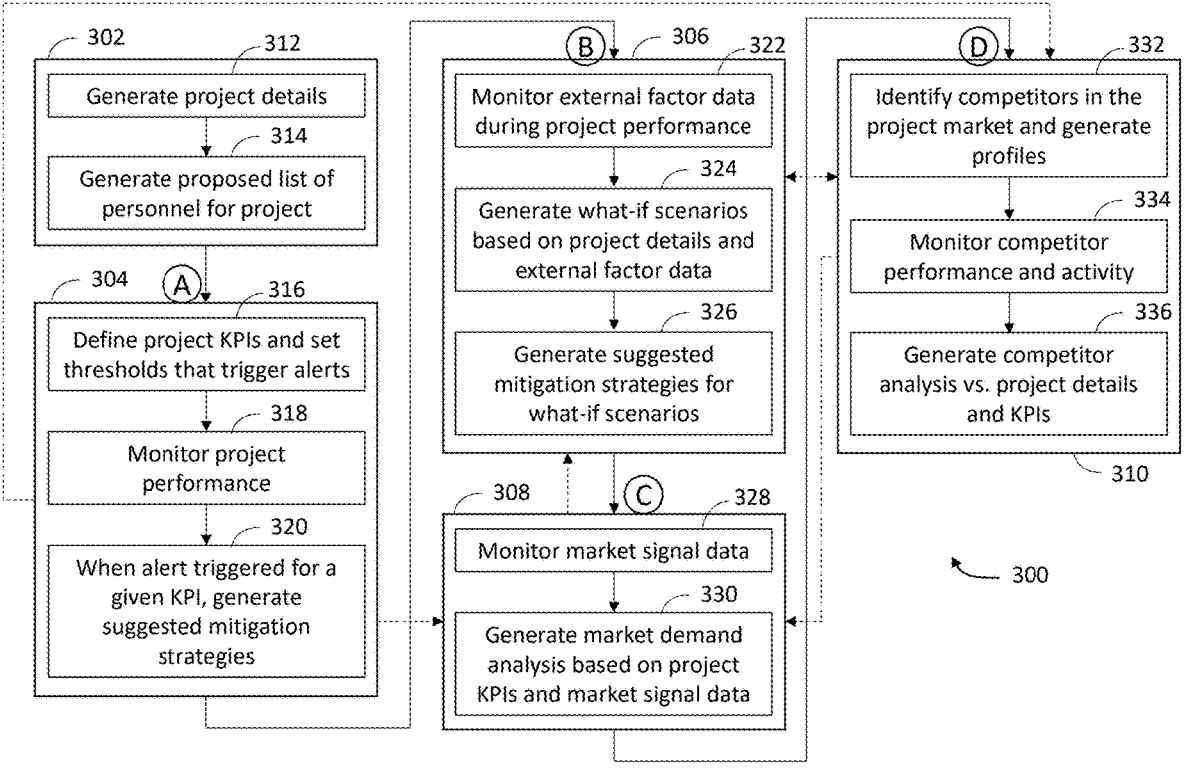
FIG. 3 is a flowchart showing example workflows enabled by embodiments of the invention.

FIG. 3 is a flowchart 300 showing example workflows enabled by embodiments of the invention. As shown in FIG. 3, the workflows can be broken down into phases including an ideation phase 302, a project monitor phase 304, an external factor monitoring phase 306, a market monitoring phase 308, and a competitor analysis phase 310. As shown in FIG. 3, the order of the phases can vary depending on project needs. It should be noted that each phase may operate independently of the other phases. For example, the ideation phase 302 may be the only phase performed by a team by design in order to generate ideas for solving a problem. Moreover, each phase may operate in conjunction with only a subset of the remaining phases. For example, the ideation phase 302 may be followed by the project monitor phase 304 as shown in FIG. 3, which is followed by the market monitoring phase 308, after which the process is complete as desired by the project team.

In an embodiment, the ideation phase 302 uses the ideation module 114 (shown in FIG. 1) to generate ideas for one or more projects. More specifically, the ideation module 114 interacts with the AI model 108 to generate ideas 312 for one or more projects based on existing data in database 104, including existing project names or descriptions, existing ideas or patent entries, and/or existing challenges or innovation funds. For example, the ideation module 114 may use one or more personas (which may be user specified or machine specified) to generate prompts for the AI model 108, requesting ideas responsive to a challenge. The AI model 108 tokenizes the prompts and generates ideas 312 based on the prompts as is known in the art. Based on the details of the generated ideas, the ideation module 114 interacts with the AI model 108 to propose 314 personnel for the projects based on existing personnel data stored in the database 104. The proposed project and personnel details can be stored in the database 104 and sent to one or more client devices 102 (shown in FIG. 1) to viewing and approval by users. In an embodiment, the workflow then moves to the project monitoring phase 304 at point A in FIG. 3.

In the project monitoring phase 304, the RAID module 116 defines 316 or receives user-designated key performance indicators (KPIs) for a selected project. KPIs could include a designated budget, proposed project overall timeline and workstream timelines, team members and roles, and tasks and their order of completion and proposed time to completion. Alternatively, AI model 108 proposes KPI values based on the historical data used to train the AI model 108 and on the project details and personnel. For example, the RAID module 116 may send to the AI model 108 details of a selected project, such as a description. The AI model 108 tokenizes the details prompt and proposes the KPI values. In addition, the RAID module 116 may interact with the AI model 108 to generate thresholds for the KPIs that will trigger alerts if crossed. During project performance, the RAID module 116 monitors 318 the KPI values. When a threshold value is crossed, the RAID module 116 alerts users via a client device 102 and interacts with the AI model 108 to generate 320 suggested mitigation strategies. The information generated by the AI model 108 during the project monitoring phase 304 is stored in the database 104 and, as such, the next time a project team desires to execute the ideation phase 302, for example, the KPI values and thresholds and historical threshold violations can be used by the AI model 108 to generates ideas that are less likely to violate the KPI thresholds during project performance. In an embodiment, the workflow then moves to the external factor monitoring phase 306 at point B in FIG. 3. Alternatively, the workflow moves to the market monitoring phase 308 at point C in FIG. 3 or to the competitor analysis phase 310 at point D in FIG. 3.

In the external factor monitoring phase 306, the external factors module 118 monitors 322 various external factor data during project performance. Examples of this data include, but are not limited to, research reports, market news, bank statements, credit stores, market sentiment data, customer behavior data, and transaction data. This data may be stored in the database 104 and periodically compared against project KPIs and internal policies by the AI model 108 and/or the external factors module 118. Based on those comparisons, the external factors module 118 interacts with the AI model 108 to generate 324 one or more what-if scenarios. For those what-if scenarios, the external factors module 118 and AI model 108 then generate 326 one or more suggested mitigation strategies. The information generated by the AI model 108 during the external factor monitoring phase 306 is stored in the database 104 and, as such, the next time a project team desires to execute the ideation phase 302, for example, the external factor data can be used by the AI model 108 to generates ideas that are more likely to comply with company policies or to align with customer desires based on customer behavior data. In an embodiment, the workflow then moves to the market monitoring phase 308 at point C in FIG. 3. Alternatively, the workflow moves to the competitor analysis phase 310 at point D in FIG. 3.

In the market monitoring phase 308, the market module 120 monitors 328 designated market signal data. Examples of this data include, but are not limited to, market analyses of vendors, pricing comparisons, macro-economic risk data, and jurisdictional requirements and regulations. This data may be stored in the database 104. Relevant data for the market monitoring phase 308 may also include questionnaire data provided by a project lead or similar role. The questionnaire data may be stored in the database 104 and can include company name, a project overview description (e.g., value proposition or synopsis), key product features, estimated pricing per sale, sales forecasts, estimate operating margin, target industry for the project, targeted geographical locations, and/or available market in terms of revenue. During this phase, the market module 120 interacts with the AI model 108 to generate 330 a market demand analysis based on the market signal data, questionnaire data, and/or project KPIs. The information generated by the AI model 108 during the market monitoring phase 308 is stored in the database 104 and, as such, the next time a project team desires to execute the ideation phase 302, for example, the market signal data can be used by the AI model 108 to generates ideas that are more likely to comply with jurisdictional requirements and regulations or to align with vendor pricing estimates. In an embodiment, the workflow then moves to the competitor analysis phase 310 at point D in FIG. 3. Alternatively, the workflow may move to the external factor monitoring phase 306 at point B in FIG. 3.

In the competitor analysis phase 310, the competitor module 122 interacts with the AI model 108 to identify 332 competitors in the project market and generate profiles of the competitors. The competitor module 122 also monitors 334 competitor performance and activity. The competitor profiles and performance data may be stored in the database 104. During project performance, the competitor module 122 and AI model 108 periodically compare the competitor profile and performance data with the project details and project KPIs stored in the database 104 and generates 336 a competitor analysis. The analysis could focus on a single, most dominant competitor or could focus on all identified competitors. The information generated by the AI model 108 during the competitor analysis phase 310 is stored in the database 104 and, as such, the next time a project team desires to execute the ideation phase 302, for example, the competitor profile data can be used by the LLM 108 to generates ideas that are less likely to directly compete with competitors and/or more likely to include a feature that is not offered by competitors. Depending on the path to the competitor analysis phase 310, the workflow may move to the external factor monitoring phase 306 at point B in FIG. 3 or to the market monitoring phase 308 at point C in FIG. 3 or may end.

Figure 4:
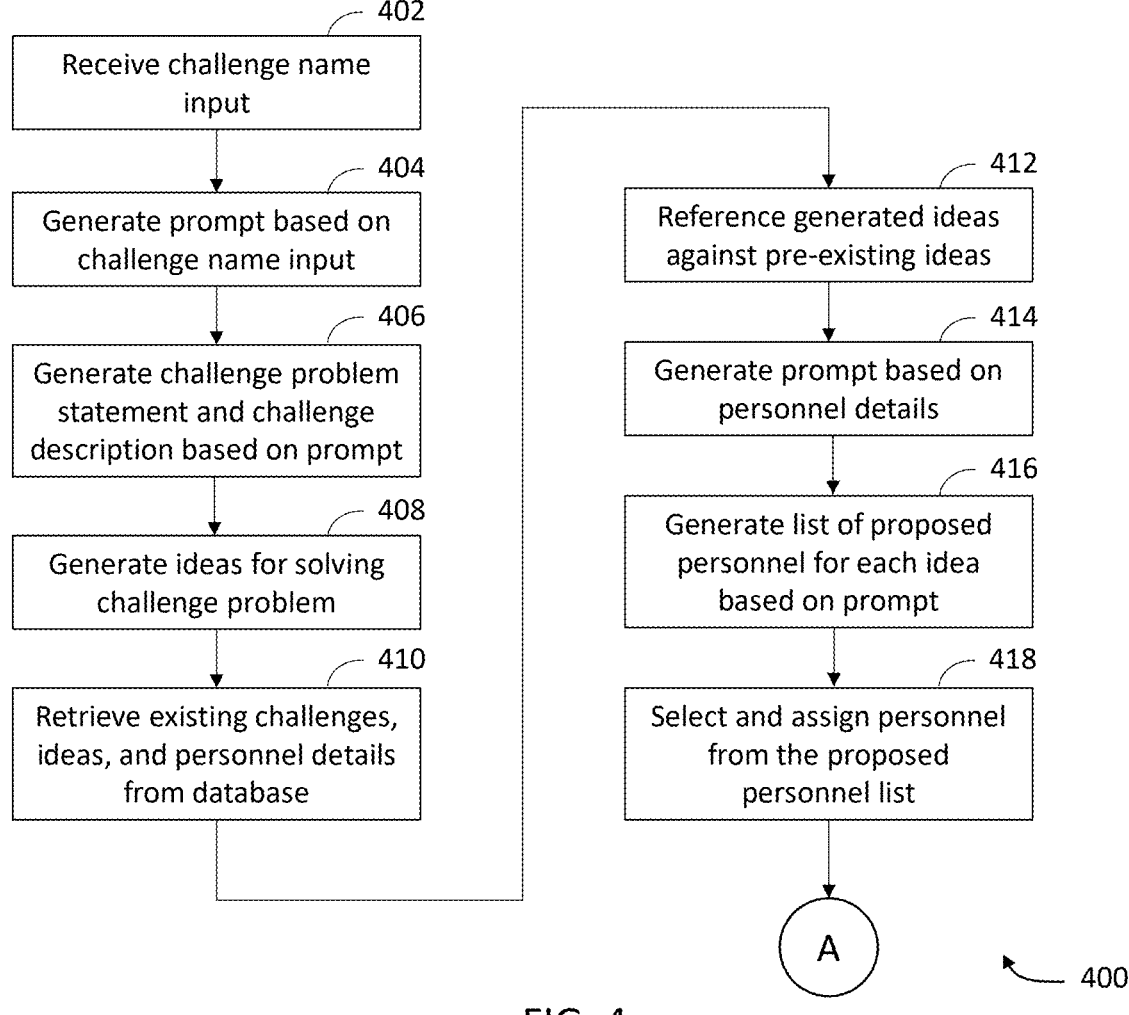
FIG. 4 is a flowchart illustrating the ideation phase of FIG. 3 in more detail.

FIG. 4 is a flowchart 400 illustrating the ideation phase 302 in more detail. In an embodiment, the ideation module 114 receives 402 a challenge name and/or description as input, such as from a client device 102. For example, a chatbot may be presented to a user via a client device 102. The user can input a challenge name and/or description and chatbot may then send the challenge name and/or description to the AI model 108. In one embodiment, the AI model 108 may use cognitive science to assess a user's creative process or innovative thinking profile and determine various brainstorming exercises personalized to their creative thinking process to elicit the right ideas in the right ways from the user. For example, the AI model 108 and the ideation module 114 may seed the user with various views such as ideas submitted by others in a similar ideation session (as retrieved from the database 104); internal company ideas, innovation initiatives already submitted, underway, or implemented; existing competitor and market information related to the discussion; market signals or opportunity spaces for consideration; and/or recent intellectual property filings in the space. In another embodiment, where a team may be working together from different locations and different time zones, for example, the AI model 108 in coordination with the ideation module 114 may bring users together in a collaborative space once thy are done ideating on their own then grow their ideas together. For example, the users may be guided to prioritize ideas from their session using pre-determined company intelligence or evaluation parameters. The users may also delve deeper into the design of a concept and create multi-dimensional prototypes or visualizations in various mediums based on the users' verbal or written guidance fed into the AI model 108. These sessions can include prototyping in a metaverse innovation lab space for others to react to and allow the user to manipulate the design, such as by grasping the prototype, and save the iterations for future reference or pivots.

The ideation module 114 and AI model 108 then interact to generate 404 a prompt based on the input challenge name. In an embodiment, the ideation module 114 preprocesses the text string to remove unnecessary characters, punctuation, or special symbols to ensure that the input is clean and ready for further analysis by the AI model 108. The preprocessed string may then be transmitted to the AI model 108 for tokenization, wherein the string is broken down into smaller units such as words or subwords. This step enables the LLM 108 to better understand the structure and meaning of the text. The AI model 108 may then encode the tokenized text into numerical representations by mapping each token to a unique numerical value. The AI model 108 may then process the encoded text and generate predictions based on its understanding of the encoded text using a probabilistic analysis that outputs the next most likely word in sequence. That processing results in a prompt generated by the AI model 108. The prompt may be a continuation of the original text string or a restatement of the original text string or a newly generated text string based on the original text string. The AI model 108 temporarily stores the prompt for use in the next step, which is for the AI model 108 to generate 406 a challenge or project problem statement and description. This process is similar to the steps above in which the AI model 108 generated a prompt in response to an input text string. In an embodiment, the AI model 108 tokenizes the prompt into smaller units, encodes the tokenized text into numerical representations, and processes the encoded text to generate predictions. These steps result in text output by the AI model 108 of a challenge or project problem statement and description. The AI model 108 transmits this information to the ideation module 114, which may then store this information in the database 104. The above description describes the general interactions between the various modules and the AI model 108 as used by the invention. To avoid repetition, this description may not be fully described for each interaction between the modules and the AI model 108.

In an embodiment, the AI model 108 uses the challenge or project problem statement and description to then generate 408 one or more ideas for solving the problem presented. This information is also transmitted to the ideation module 114 for storage in the database 104. The ideation module 114 may then retrieve 410 existing challenge or project details from the database 104, which details may include problem statements, solution ideas, and personnel that executed these ideas through creation of products. The ideation module 114 may transmit the details of these retrieved details to the AI model 108 for reference 412 against the newly generated ideas. For example, the AI model 108 may compare industries referenced by the previous ideas against industries that the newly generated idea may involve with the goal being to avoid overlap resulting in duplicative products created in the same industry. Results of these comparisons may be sent to the ideation module 114, which can then write the ideas to the database 104. This may be done by, for example, the ideation module 114 creating a JSON file that includes the idea details and storing the JSON file to the database 104.

Based on the details of the generated ideas, such as the idea name and the technical details of the solution to the problem statement, the AI model 108 can generate 414 a prompt that will be used to identify suggested personnel to staff the newly generated idea. The steps to generate this prompt are the same as above: the AI model 108 may tokenize the personnel and idea details into smaller units, encode the tokenized text into numerical representations, and process the encoded text to generate predictions using a probabilistic analysis. This processing results in a prompt generated by the AI model 108 to, for example, generate 416 a list of personnel suited to staff the newly generated idea project. The AI model 108 may then process this prompt as above and while analyzing the idea information and the personnel assigned to the earlier ideas. Alternatively, the AI model 108 may be or interact with a retrieval-augmented generation (RAG) model that tokenizes the idea details and uses those tokens to search a database, such as database 104, for personnel that match certain tokens or token attributes.

The AI model 108 may then send the proposed personnel to the ideation module 114, which may then present the list to one or more users via client devices 102. Personnel may then be selected 418 and assigned to the newly generated project, and the selections transmitted by the client device 102 to the ideation module 114, which links the selected personnel to the project in the database 104. At this point the project has been created and personnel have been assigned; the overall workflow may now move to the project monitoring phase 304 (shown in FIGS. 3 and 5) at point A.

Figure 5:
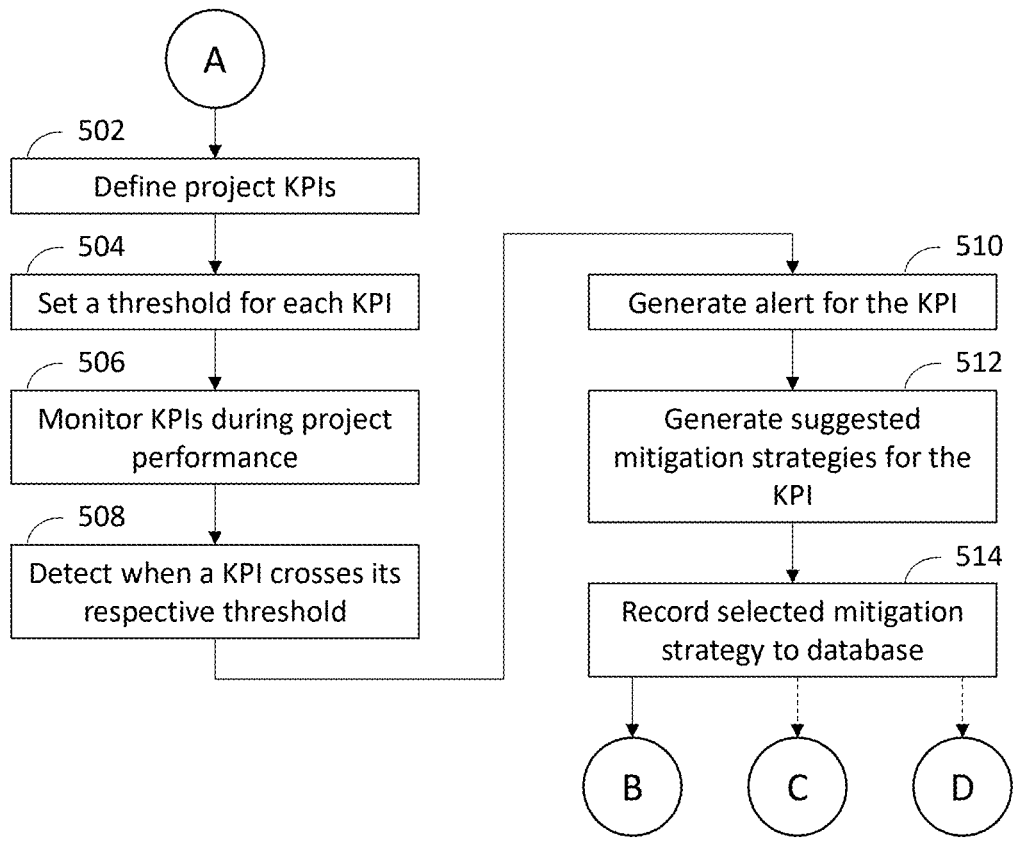
FIG. 5 is a flowchart illustrating the project monitoring phase of FIG. 3 in more detail.

FIG. 5 is a flowchart 500 illustrating the project monitoring phase 304 in more detail. In one embodiment, the workflow moves from the ideation phase 302 (shown in FIGS. 3 and 4) to the project monitoring phase 304. During the project monitoring phase 304, the system 100 acts as an early warning system for the project created during the ideation phase 302. For example, the AI model 108 may establish early warnings that monitor project progress and performance indicators with respect to, for example, timelines, resources, funding, and current RAID log items. If the project deviates from the expected outcomes, the AI model 108 may trigger an alert to prevent potential roadblocks from escalating.

In one embodiment, the RAID module 116 interacts with the AI model 108 to define 502 project KPIs such as project timelines (overall timeline and task timelines), budget adherence (overall and task-focused budgets), client satisfaction scores, and the like. To do this, the RAID module 116 can query project historical data from the database 104 and transmit the historical data to the AI model 108. The RAID module 116 may also identify to the AI model 108 the project of immediate interest. In one embodiment, the RAID module 116 may transmit important historical data and the identity of the project of interest to the AI model 108 in the form of a prompt. For example, the RAID module 116 may request the AI model 108 to generate or define the KPIs based on the transmitted data. The AI model 108, in turn, may generate suggested KPIs using the above-described method of tokenization, encoding, and processing the transmitted data to generate suggested KPIs using a probabilistic analysis. In some embodiments, a chatbot may be presented to a user via a client device 102. The user can input one or more KPIs related to the project and then chatbot may then send the KPIs to the AI model 108.

The AI model 108 may use the same method to process the project details, historical data, and newly generated KPIs to suggest 504 thresholds for each KPI. The thresholds may be in any form that make sense given the KPI itself. For example, a threshold relating to an overall project timeline may be crossed if the project does not meet certain milestones within a day of the projected date. As another example, a threshold relating to a budget allocated to a specific task may be crossed if the budget reaches 90% of total budget before the task is complete. The KPIs and thresholds may be transmitted back to the RAID module 116 for storage in the database 104. Thresholds may also be input to the AI model 108 via the RAID module 116 as submitted by a user into a chatbot through a client device 102.

After the KPIs and associated thresholds have been generated, the RAID module 116 monitors 506 the KPIs during project performance and detects 508 when a KPI crosses its respective threshold. As an example, the database 104 may include spending data for the project or a task within the project. The RAID module 116 may periodically (e.g., daily or weekly) query the database 104 for the amount of money spent. When the spending for that specific task crosses the threshold (e.g., 90% of allowed budget for the task) before the task is marked as complete, the RAID module 116 may generate 510 an alert for that KPI. The alert may be transmitted to the AI model 108 with details about the KPI, the threshold, and the degree to which the threshold has been crossed. For example, that the spending for that task is at 95% of budget with the task being only 75% complete. The RAID module 116 may also transmit the alert to one or more client devices 102. In an alternative embodiment, the LLM 108 monitors 506 the KPIs, detects 508 when a KPI crosses a threshold, and/or generates 510 an alert.

In response to the alert, the AI model 108 may generate 512 one or more mitigation strategies to avoid the project being late or over budget, for example. In one embodiment, the RAID module 116 generates a prompt for the AI model 108 including details on the project, the KPI, and the KPI threshold. The AI model 108 uses the prompt and details on other projects, programs, or portfolios and their associated KPIs stored in the database 104 to conduct a probabilistic analysis to output one or more mitigation strategies. For example, the AI model 108 may determine that past projects moved budget from one task to another or one project to another to fill in funding shortfalls. The AI model 108 transmits the generated mitigation strategies to the RAID module 116 and/or to one or more client devices 102. Table 1 below provides example mitigation strategies for several risks detected by the RAID module 116 and/or the AI model 108.

Figure 7:
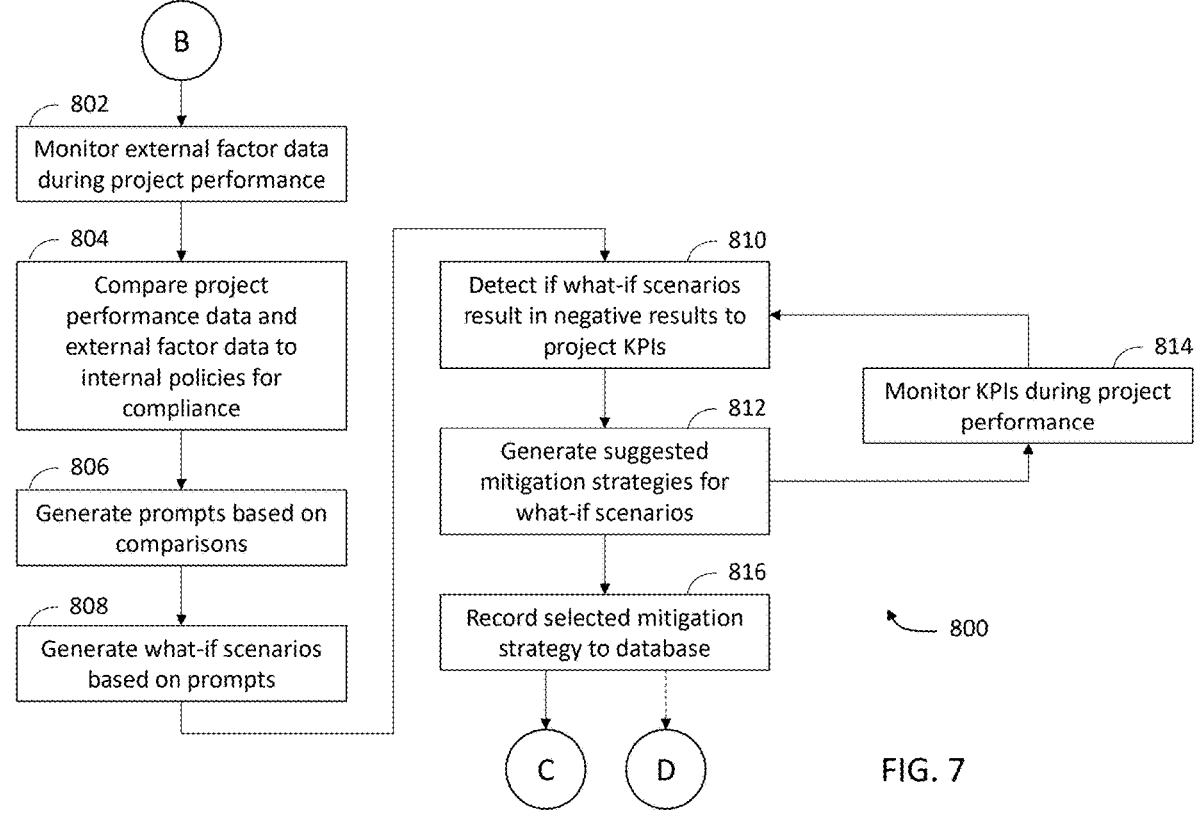
FIG. 7 is a sample user interface that shows example risk metrics for a specific project.

FIG. 7 is a flowchart 800 illustrating the external factor monitoring phase 306 in more detail. The external factor monitoring phase 306 integrates external data sources and internal data on customers and then aligns the integrated data with certain financial scenarios and internal policies. This enables a user to send a prompt from a client device 102 to the AI model 108 to analyze the data. The AI model 108 provides the output to the external factors module 118 for transmission to the client device 102 and display to the user. The external data can include data such as, but not limited to, research reports, market news, bank statements of the company, or credit scores for businesses or customers. Data can also be periodically added and refreshed for storage in the database 104, such as market sentiment data, customer behavior data, and transaction data for businesses or customers. A user may also enter questions or provide additional insights through a chatbot presented by the client device 102. The client device 102 may transmit the additional text to the RAID module 116 and/or the AI model 108.

In one embodiment, the external factors module 118 monitors 802 all or some of the various data types described above (stored in the database 104) during project performance. The AI model 108 then compares 804 project performance data to the external factor data and to internal policies for compliance. For example, the AI model 108 may compare the projected project timeline to customer sentiment data and/or market news data. Another example is comparison of internal policies and/or regulatory policies against project data such as how customer data is handled and stored. Based on the comparison the AI model 108 (or the external factors module 118) generates 806 prompts for

TABLE 1

| Risk or Early Warning Sign | Example Mitigation Strategy |
| --- | --- |
| GDPR affecting access to personal data about customers | Ensure that the project complies with all relevant GDPR regulations, obtain consent from customers to user their data, and implement appropriate security measures to protect the data |
| A data scientist is new to the role and may not have all the necessary technical capabilities | Provide additional training or support to ensure that the data scientist can contribute effectively to the project |
| Two other companies are developing the same product now | Conduct a thorough market analysis to identify any potential gaps in the market and differentiate the product from competitors |
| If interest rates go beyond 6% it might impact the business as real disposable income declines | Monitor interest rates closely and adjust the business strategy accordingly |
| Concerns about a developer's lack of experience with building APIs, which is needed for the project | Provide additional training or support to ensure that the developer can contribute effectively to the project |
| Risk that the total funding available for the project may not be enough to complete it | Revisit the budget and funding requirements for the project to ensure that it is adequately funded and has the resources it needs to be successful |
| Risk of using customer credit scores from customers in Russia, which is a sanctioned country | Ensure that credit scores are only obtained from customers who reside in non-sanctioned countries |

The selected mitigation strategy may then be recorded 514 in the database 104 for future reference by the AI model 108 when generating additional mitigation strategies. The overall workflow may now move to the external factor monitoring phase 306 (shown in FIGS. 3 and 8) at point B. However, in alternative embodiments the workflow may move instead to either the market monitoring phase 308 (shown in FIGS. 3 and 11) at point C or to the competitor analysis phase 310 (shown in FIGS. 3 and 12) at point D.

Figure 6:
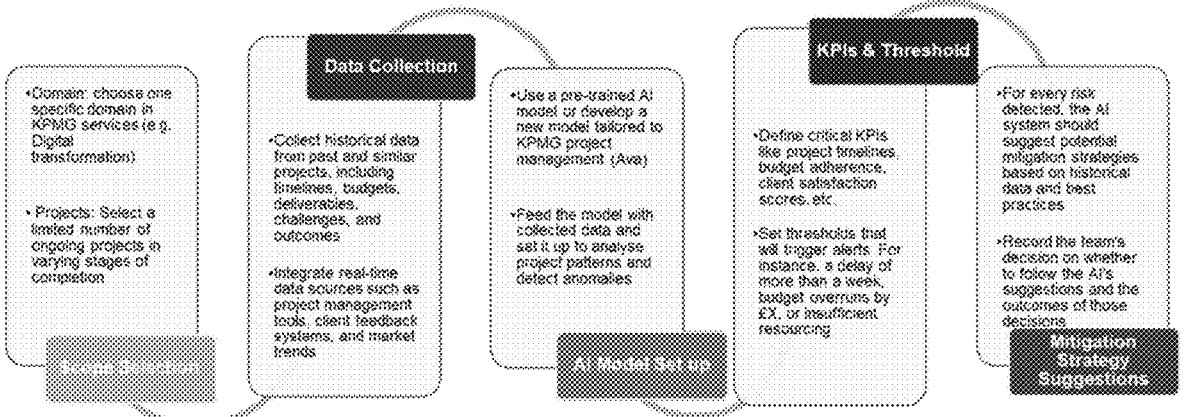
FIG. 6 is another example flowchart illustrating the project monitoring phase of FIG. 5.

FIG. 6 is another example flowchart illustrating the project monitoring phase 304. The flowchart of FIG. 6 includes substantially the same steps as shown in FIG. 5.

the AI model 108 that instruct the AI model 108 to determine whether the project continues to be an appropriate use of funds and staff time. The prompt construction is performed as described above with tokenization, encoding, and probabilistic analysis of the comparison data. In some embodiments, these comparisons are combined by the external factors module 118 or the AI model 108 to create product module outcomes in terms of probable revenue related to the project, profitability, or other metrics that enable the business to prioritize or de-prioritize the project in response to the change in external and internal data factors. In response to the prompts, the AI model 108 generates 808 one or more what-if scenarios for user consideration. For example, the AI model 108 can consider changes to the product model outcome based on specific changes to analyst reports.

In one embodiment, the AI model 108 can also detect 810 when a what-if scenario would have a negative impact on one or more project, portfolio, or program KPI. After detecting a situation, the AI model 108 may generate 812 one or more mitigation strategies. For example, were the AI model 108 to detect that a what-if scenario, such as change in customer behavior due to a boycott of certain types of products, were to have a large impact on the profitability KPI of the project, the AI model 108 could then generate a mitigation strategy. One such strategy would be to increase marketing budget for important customer demographics for the product in order to shift the market towards those that are not participating in the boycott. The external factors module 118 and/or the AI model 108 may then continue to monitor 814 project KPIs during project performance. Moreover, a mitigation strategy that is selected may then be recorded 816 in the database 104 for future reference by the AI model 108 when generating additional mitigation strategies. The overall workflow may now move to the market monitoring phase 308 (shown in FIGS. 3 and 11) at point C. However, in alternative embodiments the workflow may move instead to the competitor analysis phase 310 (shown in FIGS. 3 and 12) at point D.

Figure 8:
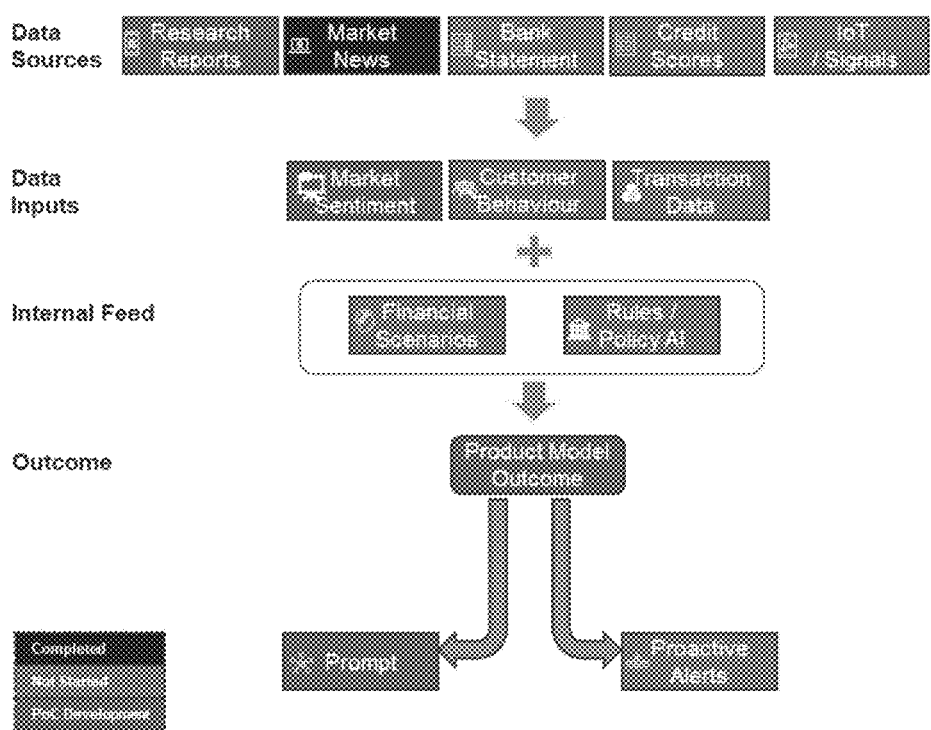
FIG. 8 is a flowchart illustrating the external factor monitoring phase of FIG. 3 in more detail.

FIG. 8 is another example flowchart illustrating the external factor monitoring phase 306. The flowchart of FIG. 8 includes substantially the same steps as shown in FIG. 7.

Figure 9:
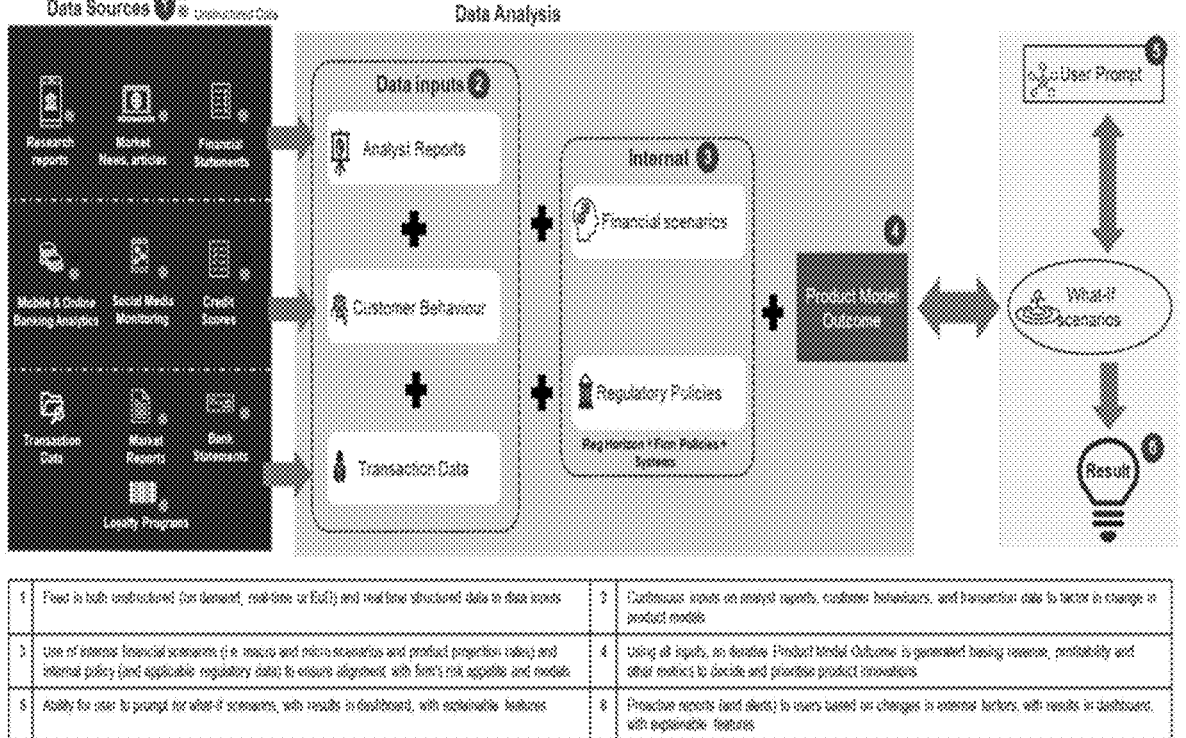
FIG. 9 is another example flowchart illustrating the external factor monitoring phase of FIG. 8.

FIG. 9 is another example flowchart of the external factor monitoring phase 306. The flowchart of FIG. 9 includes substantially the same steps as shown in FIGS. 7 and 8.

Figure 10:
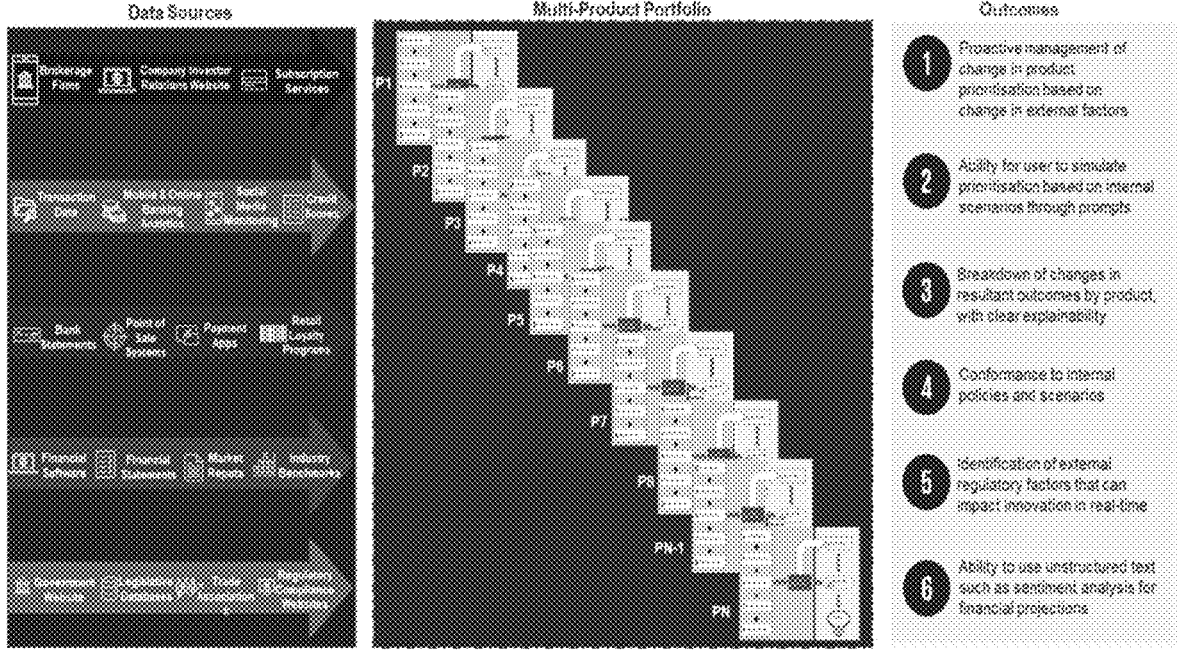
FIG. 10 is another example flowchart of the external factor monitoring phase of FIG. 8.

FIG. 10 is an illustration of the external factor monitoring phase 306 monitoring a multi-product portfolio. In some embodiments, the AI model 108 not only monitors data related to a project but also to multiple projects within a portfolio, the entirety of a portfolio as a whole, multiple portfolios each including one or more projects, and/or a program that includes one or more portfolios. In those embodiments, the AI model 108 may generate what-if scenarios and mitigation strategies that relate to a single project, multiple projects, a portfolio, multiple portfolios, a program, or multiple programs. In some embodiments, the what-if scenarios and mitigation strategies may cross over to relate to projects in different portfolios and/or portfolios in different programs.

Figure 11:
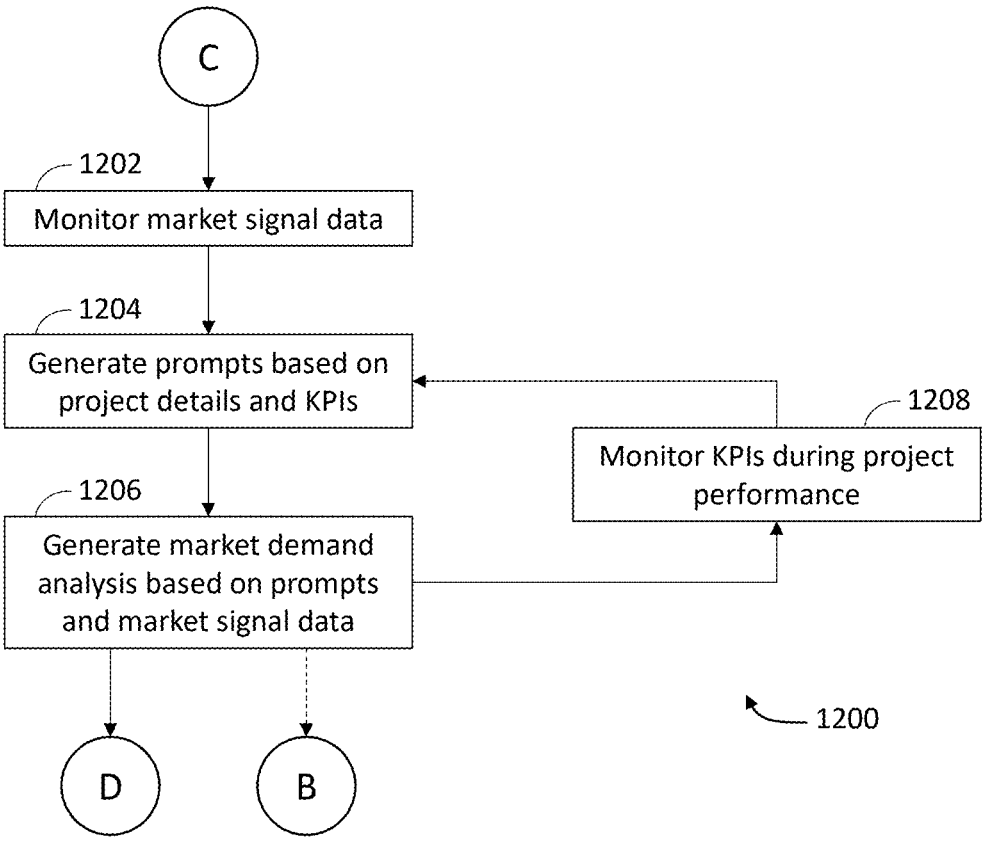
FIG. 11 is a flowchart illustrating the market monitoring phase of FIG. 3 in more detail.

FIG. 11 is a flowchart 1200 illustrating the market monitoring phase 308 in more detail. In one embodiment, the market module 120 ingests user provided information related to a project, product portfolio, program, and/or company. The market module 120 stores the ingested user data in the database 104. In addition, the user data can be used to further train the AI model 108 as described above. Table 2 below includes some types of information collected as user data.

TABLE 2

| Question | | Answer |
|---|---|---|
| 1. What is the name of your company? | | |
| 2. Please provide a brief overview of your innovation proposal, including the value proposition, product synopsis, product pricing, etc. | | |
| 3. Briefly describe the key product features in your innovation proposal. | | |
| 4. For this innovation proposal, do you | a. | Between £500k-£750k |

TABLE 2-continued

| Question | | Answer |
|---|---|---|
| have the estimated pricing per sale? | b. | Between £750k-£1m |
| | c. | More than £1m |
| 5. Can you provide the sales forecast for this innovation proposal for the next 2/3/5 years? | | |
| 6. What is the estimated benefit of you innovation proposal? | a. | <2% |
| | b. | 2%-5% |
| | c. | 5%-10% |
| | d. | >10% |
| 7. What is the target industry for this innovation proposal? | a. | Manufacturing |
| | b. | IT & Communications |
| | c. | Financial Services |
| | d. | Defense |
| | e. | Healthcare |
| | f. | Insurance |
| | g. | Education |
| 8. What geographical locations are you targeting for the innovation proposal? | a. | North America |
| | b. | UK and Northern Ireland |
| | c. | Europe |
| | d. | Asia-Pacific |
| | e. | South America |
| | f. | Middle East and Africa |
| 9. What is the market size of the client for this innovation proposal? | a. | Less than £500m |
| | b. | Between £500m-£1b |
| | c. | Between £1b-£5b |
| | d. | More than £5b |
| 10. Please provide any additional information that might help in the assessment of your innovation proposal. | | |
| 11. Please upload any documents that might be beneficial in assessing this innovation proposal, including Market Discovery Reports, Product Synopsis, Funding Allocation, The "Mission," etc. | | |

In addition to the user provided data, the market module 120 may ingest data from vendors or the internet. The additional data, as well as the user provided data, may be either structured or unstructured, and is all stored in the database 104. The vendor or internet data may be continuously or periodically updated through a data feed or API. During project performance, the market module 120 monitors 1202 the market signal data. A user may also submit changes to the previously provided user data, such as through a chatbot presented by a client device 102 and communicating with the AI model 108. For example, a user may become aware of a regulatory change that could impact the market size. The user can interact with the chatbot to provide a new market size, which would then be considered by the AI model 108 as described below.

At the beginning of the product, and potentially at points during project performance, it would be useful to have a market analysis of vendors, pricing comparisons, macroeconomic risks, and jurisdictional requirements and regulations. As such, in some embodiments, the market module 120 may prompt a user of a client device 102 to request or accept a market analysis report. If the user agrees, the market module 120 transmits the order to the AI model 108 and the AI model 108 generates 1204 a prompt based on desired market signals, project KPIs, and other details of the project. The AI model 108 generates the prompt using the same tokenization, encoding, and probability analysis of the message from the market module 120. The AI model 108 then uses the prompt to generate 1206 a market demand analysis including the items described above. The market module 120 and/or the AI model 108 also continue to monitor 1208 project KPIs during performance. In some embodiments, if a KPI crosses a threshold as describe above, the AI model 108 may generate a new prompt and a new market demand analysis. The overall workflow may now move to the competitor analysis phase 310 (shown in FIGS. 3 and 12) at point D. However, in alternative embodiments the workflow may move instead to the external factor monitoring phase 306 (shown in FIGS. 3 and 7) at point C.

Figure 12:
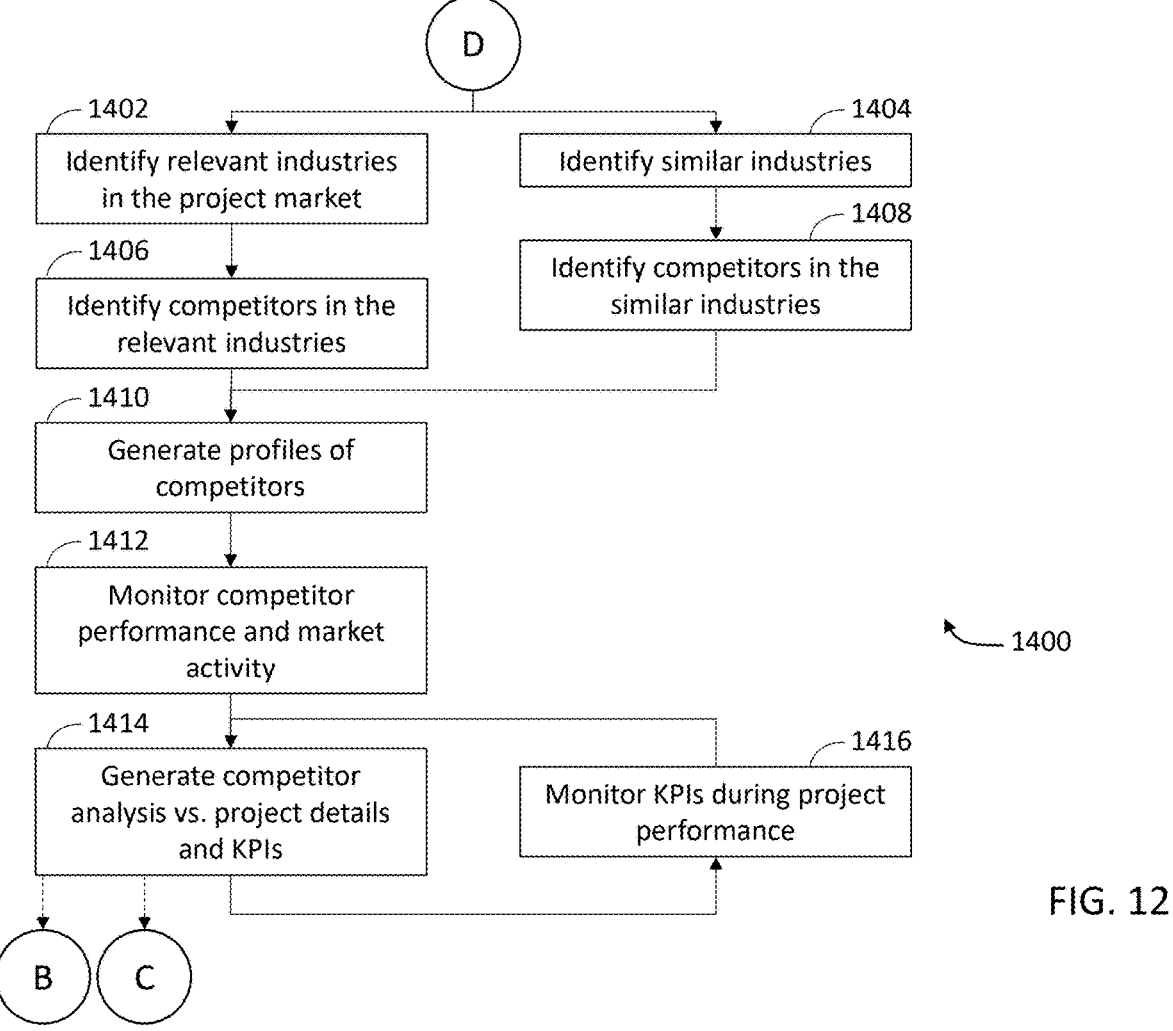
FIG. 12 is a flowchart illustrating the competitor analysis phase of FIG. 3 in more detail.

FIG. 12 is a flowchart 1400 illustrating the competitor analysis phase 310 in more detail. This phase uses the competitor module 122 and the AI model 108 to generate a comprehensive analysis of the competitor landscape for a project, portfolio, program, or entire business. As described above with respect to training the AI model 108, the data used in this phase can include information about competitors and industries such as investment information, recent news articles, product listings, publicly available regulatory filings, publicly available court documents, patents and published patent applications, trademarks and published trademark applications, copyright registrations, fundraising information, company leadership profiles (e.g., CEO and the like), acquisition information, industry classifications, and the like. This data may also be stored in the database 104 or available through a data feed or API.

In some embodiments, the AI model 108 identifies 1402 relevant industries in the market for the project (or portfolio or program). The AI model 108 also identifies 1404 similar industries to the project market. These identifications can be done by the AI model 108 using industry classification information, for example. In one embodiment, the AI model 108 uses an industry classification for the project and then searches the database 104 for other companies that have the same industry classification. The AI model 108 then identifies 1406 competitors in the relevant industries and identifies 1408 competitors in the similar industries. This provides as complete a picture as possible when comparing competitors for the project. In one embodiment, after the AI model 108 has identified companies in the same industry classification as the project, the AI model 108 then identifies companies in related industry classifications. For example, a project in the 541512 industry classification of the North American Industry Classification System for computer systems design services can be cross-referenced with companies in the same industry classification as well as companies in other industry classifications such as 541330 (engineering services), 541511 (custom computer programming services), 449210 (electronics and appliance retailers), and/or 423430 (computer and computer peripheral equipment and software merchant wholesalers).

Using the identified competitor names, the AI model 108 generates 1410 a profile for each competitor, or at least a portion of the competitors with sufficient similarities. Those similarities could include revenues, headquarter location, geographic sales markets, or recent news updates, for example. To generate the profiles, the AI model 108 may perform a web search or search the database 104 for data relevant to each competitor. As noted above, a number of different types of data is collected and included in the competitor profiles. The competitor module 122 may also be used to select specific metrics to assess competitors, including background, operations, industry, investor sentiment, and/or level of investment received. The AI model 108 may send the collected information to the competitor module 122 and the competitor module 122 can then assemble the competitor reports and analyses for viewing and manipulation via a client device 102.

In some embodiments, the competitor module 122 and/or the LLM 108 monitor 1412 competitor performance and competitor related market activity during project performance. For example, the LLM 108 may conduct a query as before on one or more of the identified competitors at specific gates for the project or just periodically. The LLM 108 may then send the updated information to the competitor module 122 to generate 1414 an updated competitor report. In some embodiments, the LLM 108 may also compare competitor data against project KPIs. For example, the LLM 108 may compare competitor revenues in one or more geographies for competing products against the projected revenue of the project in that market. If the competitor revenues change such that they are below the project revenue of the project in that market, the project team may wish to determine if the market preferences have changed or if the competitor has made changes to their product that negatively affected sales. Moreover, in some embodiments, the LLM 108 may continue to monitor 1416 project KPIs during project performance. If a previous phase described above resulted in changes to projected revenues for the project, the LLM 108 may then generate 1414 new comparisons against competitors. The overall workflow may now end. Alternatively, the workflow may move instead to the external factor monitoring phase 306 (shown in FIGS. 3 and 7) at point B or to the market monitoring phase 308 (shown in FIGS. 3 and 11) at point C.

The systems and methods described here provide and enable the use of artificial intelligence to perform tasks that cannot be performed by a human. Rather, the systems and methods embodiments include commands, queries, data flows, and the like, among elements of the architecture (e.g., modules, network elements, device components, etc.) and data inputs obtained or received as well as criteria used for evaluations or decisions to provide a transformative and dynamic output in real time which are operations and processes that could not be performed manually within the context of the embodiments described herein or the claims. Moreover, the embodiments described herein can have many predefined functions that can relate and manipulate the output and flow as the process progresses. The features or functions can include programming languages, levels of complexity and types of human resources necessary to generate these variables. The different variables selected for each of the projects allow the system to store all the possibilities captured by each project through "automatic learning" processes, which help understand and interpret future projects, making cost and time estimates more accurate as the system "learns" and refines its models. The LLM, for example, will learn not only in terms of the cost and timeline of the functions or characteristics of the projects, but will also learn from each goal or milestone. At the same time the LLM will learn from each task that the project manager or "human" is assigning to the type of project. This will allow the platform to recommend new and better tasks based on the inputs that different project managers have entered.

Thus, implementations provide improvements over current solutions by incorporating generative AI in an LLM, which improves the operations of a computer system by not merely tracking user selections and other inputs. In contrast, embodiments described herein provide the following advantages and improvements over standard computer operations. For example, embodiments described herein may use an LLM (which has been trained and uses ongoing learning functions) to (a) provide suggested products or innovations based on historical projects; (b) suggest solutions to problems (real or potential) that may be encountered in a project; (c) dynamically update an innovation roadmap or project plan based on changes to external factors such as news, economic events, and so on; (d) assess market factors and provide a real-time predictive analysis of data to identify potential benefits or risks of a particular project proposal; and (e) determine competitors, their products, and their market positions to compare against current or proposed projects. Each of these improves over the function of a standard computer by the incorporation of a trained and continually learning LLM.

As such, embodiments of invention thus offer several benefits. In particular, embodiments of the invention may enable an increase in the quality and quantity of innovative ideas and improves the functionality of standard computer systems in this field by using AI models to predict logical ideas for innovation and logical teams based on existing skillsets, and to improve the ability of standard computers to predict the cost, training and resource needs, and budget to complete a project. The embodiments described herein represent an improvement to an existing technology or technologies by providing specific technologies that use AI models to generate ideas, staff projects, and monitor project compliance, competitor action, and the like. Thus, implementations improve the currently manual only end-to-end ideation and project management process. The embodiments described herein therefore do not merely recite the performance of some business practice known from the pre-computer world along with the requirement to perform it on a computer. Rather, these embodiments incorporate one or more AI models, whether generative AI or otherwise, to enable use of new or custom data, including aggregated or synthetic comparative data. Thus, the embodiments described herein are necessarily rooted in new computer technology to overcome a problem specific to product ideation and project management. In addition, the present disclosure includes specific features other than what is well-understood, routine, convention activity in the field, or adding unconventional steps that confine the claim to a particular useful application, e.g., enabling further learning as feedback to enable more accurate analyses, as described herein.

One or more aspects discussed herein may be embodied in computer-usable or readable data and/or computer-executable instructions, such as in one or more program modules, executed by one or more computers or other devices as described herein. Generally, program modules include routines, programs, objects, components data structures, and the like that perform particular tasks or implement particular abstract data types when executed by a processor in a computer or other device. The modules may be written in a source code programming language that is subsequently compiled for execution or may be written in a scripting language such as, but not limited to, HTML or XML. The computer-executable instructions may be stored on a computer-readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-readable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A computer-implemented method of innovation ideation and project management using an artificial intelligence (AI) model communicatively coupled to a server, a database, and one or more client devices by a network, the method comprising performing by the AI model:

using a query agent model to perform web searches to obtain time sensitive prompts and contextual data;

pre-process, using a machine learning model, the time sensitive prompts and contextual data to remove noise, formatting issues, and irrelevant data;

training the AI model using the pre-processed time sensitive prompts and contextual data to generate project data and key performance indicators (KPIs);

an ideation phase including the steps of:

receiving, from at least one of the one or more client devices, an ideation input associated with an innovation challenge or a proposed project;

tokenizing and encoding the ideation input to generate an ideation prompt;

generating, by the AI model, project details for at least one proposed project;

generating, by the AI model, a list of proposed personnel to staff the proposed project based on historical staffing of similar projects stored in the database; and storing, in the database, the generated project details and the list of proposed personnel as a project record;

a project monitor phase including the steps of:

defining, by the AI model, at least one KPI for the proposed project and setting a trigger threshold for the KPI based on historical performance data of projects as stored in the database;

receiving, by the AI model, an alert related to a threshold violation of the KPI and generating at least one suggested strategy for mitigating the threshold violation, wherein generating the least one suggested strategy comprises:

generating, by the AI model, a mitigation prompt that includes details of the proposed project, the KPI, the trigger threshold, and a degree to which the trigger threshold is violated; and performing a probabilistic analysis using the mitigation prompt and stored historical project records to output the at least one suggested strategy; and storing, in the database, the alert and the at least one suggested strategy in association with the project record;

an external factor monitoring phase including the steps of:

monitoring, by the AI model, external factor data during performance of the proposed project;

generating, by the AI model, at least one what-if scenario for the proposed project based on details of the proposed project and market data stored in the database;

generating, by the AI model, at least one suggested strategy for mitigating the what-if scenario based on past problem-solution data stored in the database; and storing, in the database, the at least one what-if scenario and the at least one suggested strategy for mitigating the what-if scenario in association with the project record;

a market monitoring phase including the steps of:

monitoring, by the AI model, market signal data including financial news and data stored in the database; and generating, by the AI model, a market demand analysis based on the KPI and the market signal data, wherein generating the market demand analysis comprises generating, by the AI model, a market prompt based on desired market signals, the KPI, and the project record, the market prompt being generated using tokenization, encoding, and probability analysis;

and a competitor analysis phase including the steps of:

identifying, by the AI model, at least one competitor in an industry related to the proposed project;

generating, by the AI model, a competitor profile for the identified competitor;

monitoring, by the AI model, competitor performance and activity; and generating, by the AI model, a competitor analysis in view of the proposed project details and the KPI; and analyzing, the AI model generated responses using a second AI model, to generate feedback regarding the accuracy of the responses with respect to target outputs;

in response to analyzing, retraining the AI model to update model parameters with the feedback to provide ongoing learning for subsequent project records.

2. The method of claim 1, wherein the ideation phase further includes the steps of, by the AI model:

receiving as input a name of an innovation challenge;

tokenizing and encoding the name of the innovation challenge;

generating a challenge problem statement and challenge description based on the input name;

generating the proposed project for solving the challenge problem statement; and selecting personnel from the list of proposed personnel to staff the proposed project.

3. The method of claim 2, wherein the ideation phase further includes the step of, by the AI model, seeding user ideas via a chatbot presented via at least one of the one or more client devices based on project or company information stored in the database, the information including on one or more of previous ideas, internal company initiatives, competitor information, market information, and recent intellectual property filings.

4. The method of claim 1, wherein the project monitor phase further includes the steps of:

monitoring, by the AI model, adherence to the KPI during project performance;

detecting when the KPI violates the threshold; and generating the alert related to the threshold violation for transmission over the network to at least one of the one or more client devices and for storage in the database in association with the project record.

5. The method of claim 4, wherein a risks, assumptions, issues, and dependencies (RAID) module generates the alert and transmits the alert to the client device via the network.

6. The method of claim 4, wherein a risks, assumptions, issues, and dependencies (RAID) module detects when the KPI violates the threshold by periodically comparing the threshold with the KPI.

7. The method of claim 1, wherein the external factor monitoring phase further includes the steps of, by the AI model:

collecting performance data of the proposed project;

comparing the performance data to the external factor data and internal policies;

generating the what-if scenario for the proposed project based on the comparison; and detecting if the what-if scenario results in a negative result to the KPI, and, in response, generating and storing in the database an updated mitigation prompt for the at least one suggested strategy for mitigating the what-if scenario.

8. The method of claim 1, wherein the competitor analysis phase further includes the steps of, by the AI model:

identifying the industry related to the proposed project using industry classification information stored in the database;

identifying at least one similar industry;

identifying at least one competitor in the similar industry;

generating a competitor profile for each identified competitor;

monitoring performance and activity for each identified competitor; and generating a competitor analysis for each identified competitor in view of the proposed project details and the KPI.

9. The method of claim 8, wherein identifying the at least one similar industry comprises cross-referencing an industry classification associated with the proposed project to one or more related industry classifications stored in the database and identifying competitors associated with the one or more related industry classifications.

10. The method of claim 1, further comprising using the stored alert and the stored suggested strategy for mitigating the threshold violation as training data to generate, during subsequent ideation phase for a subsequent proposed project, project details that reduce a likelihood of violating the trigger threshold for the KPI.

11. An innovation ideation and project management system comprising:

an artificial intelligence (AI) model communicatively coupled to a server, a database, and one or more client devices by a network, wherein the AI model is configured to:

using a query agent model to perform web searches to obtain time sensitive prompts and contextual data;

pre-process, using a machine learning model, the time sensitive prompts and contextual data to remove noise, formatting issues, and irrelevant data;

training the AI model using the pre-processed time sensitive prompts and contextual data to generate project data and key performance indicators (KPIs);

perform an ideation phase including the steps of:

receiving, from at least one of the one or more client devices, an ideation input associated with an innovation challenge or a proposed project;

generating an ideation prompt based on the ideation input by tokenizing and encoding the ideation input and performing probabilistic analysis;

generating project details for at least one proposed project;

generating a list of proposed personnel to staff the proposed project based on historical staffing of similar projects stored in the database; and storing, in the database, the generated project details and the list of proposed personnel as a project record;

perform a project monitor phase including the steps of:

defining at least one KPI for the proposed project and setting a trigger threshold for the KPI based on historical performance data of projects as stored in the database;

receiving an alert related to a threshold violation of the KPI and generating at least one suggested strategy for mitigating the threshold violation, wherein generating the at least one suggested strategy comprises:

generating a mitigation prompt that includes the KPI, the trigger threshold, and a degree of threshold violation; and performing probabilistic analysis using the mitigation prompt and historical project records stored in the database; and storing, in the database, the alert and the at least one suggested strategy in association with the project record;

perform an external factor monitoring phase including the steps of:

monitoring external factor data during performance of the proposed project;

generating at least one what-if scenario for the proposed project based on details of the proposed project and market data stored in the database;

generating at least one suggested strategy for mitigating the what-if scenario based on past problem-solution data stored in the database; and storing, in the database, the at least one what-if scenario and the at least one suggested strategy for mitigating the what-if scenario in association with the project record;

perform a market monitoring phase including the steps of:

monitoring market signal data including financial news and data stored in the database; and generating a market demand analysis based on the KPI and the market signal data, wherein generating the market demand analysis comprises generating a market prompt using tokenization, encoding, and probabilistic analysis based on desired market signals and the project record;

perform a competitor analysis phase including the steps of:

identifying at least one competitor in an industry related to the proposed project;

generating a competitor profile for the identified competitor;

monitoring competitor performance and activity; and generating a competitor analysis in view of the proposed project details and the KPI;

analyzing, the AI model generated responses using a second AI model, to generate feedback regarding the accuracy of the responses with respect to target outputs;

in response to analyzing, retraining the AI model to update model parameters with the feedback to provide ongoing learning for subsequent project records.

12. The system of claim 11, further comprising an ideation module, wherein:

the ideation is configured to:

receive as input a name of an innovation challenge; and interact with the AI model to generate a challenge problem statement and challenge description based on the input name by generating a prompt using tokenization, encoding, and probabilistic analysis; and the AI model is further configured to generate the proposed project for solving the challenge problem statement.

13. The system of claim 12, wherein the ideation module is further configured to:

interact with the AI model to seed user ideas via a chatbot presented by at least one of the one or more client devices based on project or company information stored in the database, the information including on one or more of previous ideas, internal company initiatives, competitor information, market information, and recent intellectual property filings; and store user responses received via the chatbot in the database for use as reference data in subsequent ideation prompts.

14. The system of claim 11, further comprising a risks, assumptions, issues, and dependencies (RAID) module, wherein:

the RAID module is configured to:

monitor adherence to the KPI during project performance; and detect when the KPI violates the threshold; and the AI model is further configured to generate the alert related to the threshold violation and to store the alert in the database in association with the project record.

15. The system of claim 14, wherein the RAID module is further configured to detect when the KPI violates the threshold by periodically comparing the threshold with the KPI based on KPI values retrieved from the database at a predetermined interval.

16. The system of claim 14, wherein the RAID module is further configured to transmit the alert to the client device via the network for display via a user interface.

17. The system of claim 11, further comprising an external factors module, wherein:

the external factors module is configured to:

collect performance data of the proposed project; and compare the performance data to the external factor data and internal policies; and the AI model is further configured to:

generate the what-if scenario for the proposed project based on the comparison by generating a what-if prompt using tokenization, encoding, and probabilistic analysis based on the comparison; and store the what-if prompt and the what-if scenario in the database in association with the project record.

18. The system of claim 11, further comprising a market module, wherein:

the market module is configured to monitor market data; and the AI model is further configured to:

generate a market demand analysis for the proposed project based on the market data by generating a market prompt using tokenization, encoding, and probabilistic analysis; and store the market demand analysis in the database in association with the project record.

19. The system of claim 11, further comprising a competitor module, wherein:

the competitor module is configured to:

identify the industry related to the proposed project;

identify at least one similar industry;

identify at least one competitor in the similar industry;

monitor performance and activity for each identified competitor; and the AI module model is further configured to:

generate a competitor profile for each identified competitor;

generate a competitor analysis for each identified competitor in view of the proposed project details and the KPI; and store the competitor profile and the competitor analysis in the database in association with the project record for use as reference data in subsequent ideation prompts.

* * * * *